(No Model.)
L. W. SUNDERLAND.
COPY HOLDER FOR PRINTERS.
No. 283,039. Patented Aug. 14, 1883.
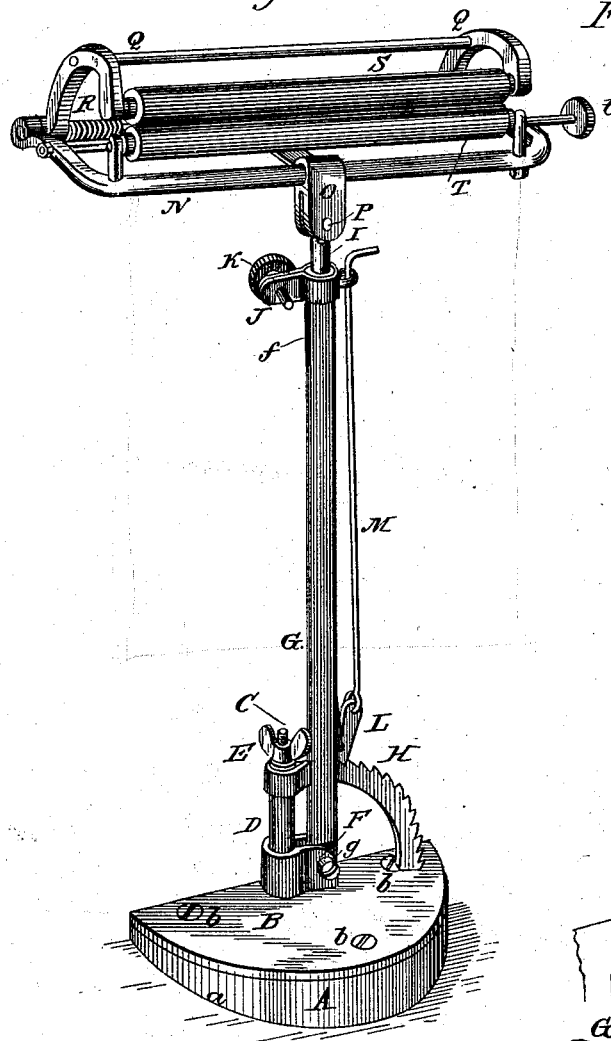
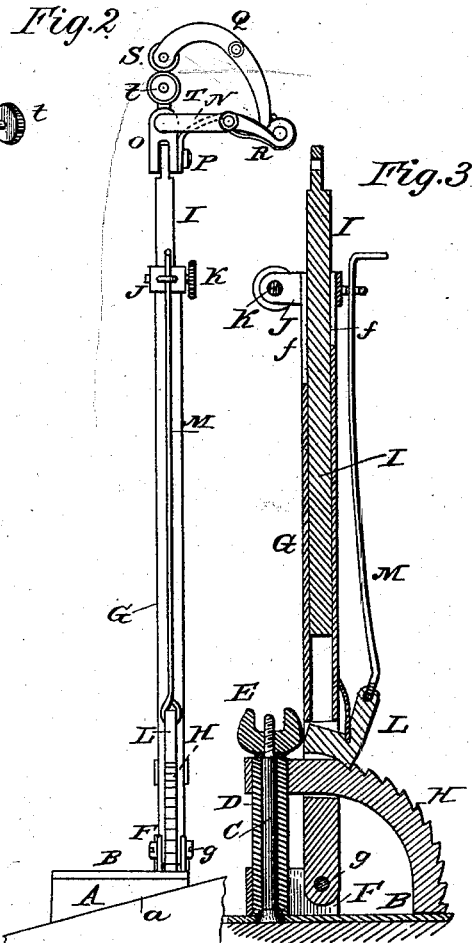
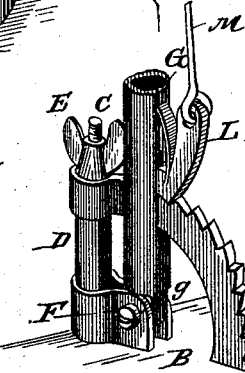
WITNESSES:
Fred. G. Dieterich
Arthur L. Morsell
Lee W. Sunderland,
INVENTOR.
By Louis Bagger & Co.
ATTORNEYS

UNITED STATES PATENT OFFICE.

LEE W. SUNDERLAND, OF BREMEN, INDIANA, ASSIGNOR OF ONE-HALF TO WILLIAM LEHR, OF SAME PLACE.

COPY-HOLDER FOR PRINTERS.

SPECIFICATION forming part of Letters Patent No. 283,039, dated August 14, 1883.

Application filed April 23, 1883. (No model.)

*To all whom it may concern:*

Be it known that I, LEE W. SUNDERLAND, of Bremen, in the county of Marshall and State of Indiana, have invented certain new and useful Improvements in Copy-Holders for Printers and Proof-Readers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved copy-holder, showing the same in its position attached to the "case," ready for use. Fig. 2 is a side view of the same. Fig. 3 is a longitudinal sectional view through the stem or shank of the device; and Fig. 4 is a perspective detail view of part of the base-plate, showing its central pintle, segmental rack, hinged bar, and pawl for effecting the adjustment of the same.

Similar letters of reference indicate corresponding parts in all the figures.

My invention has relation to devices for holding the "copy" of compositors or proof-readers; and it consists in the detailed construction and combination of parts, as hereinafter more fully described, of an apparatus which can readily be attached to the "cap." case of an ordinary composing-case, and which may be readily adjusted so as to support the copy to be composed or proofed in the position which is most advantageous to the compositor or proof-reader.

This apparatus consists of a block, A, which is cut off slanting or beveled on its under side, as shown at $a$, to adapt it to fit the top of the middle bar of the cap.-case, to which it is fastened by means of the screws $b$. Upon the top of block A is fastened a semicircular metal plate, B, in the center of which is a stud or pintle, C, which forms a bearing for the pintle-collar D, which may be fastened upon the pintle, so as to prevent it from turning, by means of the jam-screw or thumb-screw E. Upon the lower end of this collar D is a projection, F, which turns with the collar and forms a bearing for the stem or upright G, which is pivoted at $g$. Upon the upper part of collar D is fastened a segmental rack, H, the lower end of which impinges upon the top of plate B. Thus it will be seen that by loosening the thumb-screw E the pintle-collar D, with its attachments F, G, and H, may be turned to any desired angle or position, and again fastened by tightening down the thumb-screw E.

The adjustable stem G is made hollow or tubular to admit of the insertion of a rod, I, which may be moved up or down and fixed in any given position by means of a clamp, J, and screw K, the upper part of the tubular stem G being split, as shown at $f$, so that it may be clamped upon rod I by tightening the screw K. The stem G may be adjusted at any desired angle by means of a spring-pawl, L, which is operated by means of the rod or wire M.

Upon the top of the sliding rod I is hinged a frame, N, by means of the head O and set-screw P, in such a manner that by tightening the set-screw the angle of frame N relative to rod I may be adjusted at will. Upon frame N is hinged another frame, Q, which is actuated by springs R in such a manner as to bear with a roller, S, which is journaled in its free ends against the corresponding roller, T, of frame N, said roller T being provided with a milled head or nut, $t$, by means of which it may be turned by hand. I prefer to cover both the rollers S and T with rubber or similar elastic material, so they will clamp firmly the copy which is held between them.

From the foregoing description, taken in connection with the drawings, the operation of my improved copy-holder will readily be understood without requiring detailed explanation. In practice the circular plate or table B should be about four inches in diameter. The post or pintle C should be about one and three-fourths of an inch high, the extension-bars G I, respectively, about twelve and nine inches long, and the rollers about seven inches in length each, which I have found by experience will be sufficient to answer all ordinary purposes. The copy is clamped between the spring-actuated rollers S T, and may be adjusted in the position most convenient to the compositor or proof-reader by the adjustment of the several parts of the device as hereinbefore described. By simply turning the milled nut or head $t$ of the roller T, the copy may be fed between the rollers as required, and the rollers may be used to mark the lines which are being composed or proofed. All the adjustments may be effected by the use of one hand only, so that the compositor or proof-reader has at all times the use of the other hand.

Having thus described my invention, I claim and desire to secure by Letters Patent of the United States—

The improved copy-holder herein shown and described, consisting of the beveled block A, having semicircular plate or table B, provided with the fixed center post or pintle, C, having thumb-screw E, collar D, having projection F and segmental rack H, tubular stem G, hinged at $g$ and provided with the spring-pawl L, adapted to engage the rack, sliding rod I, adapted to be fixed at any given position in the tubular stem G, hinged frame N, having set-screw P, for fixing it in its adjusted position, and provided with the roller T, having milled head $t$, springs R, and spring-actuated hinged frame Q, provided with roller S, the whole constructed and combined to operate substantially in the manner and for the purpose set forth.

In testimony that I claim the foregoing as my own I have hereunto affixed my signature in presence of two witnesses.

LEE W. SUNDERLAND.

Witnesses:
GEORGE F. WAHL,
JOHN HECKAMAN.